(12) United States Patent
Yukhin et al.

(10) Patent No.: US 7,174,033 B2
(45) Date of Patent: Feb. 6, 2007

(54) METHODS AND SYSTEMS FOR DETECTING AND RECOGNIZING AN OBJECT BASED ON 3D IMAGE DATA

(75) Inventors: Artiom Yukhin, Moscow (RU); Andrei Klimov, Moscow (RU)

(73) Assignee: A4Vision, Sunnyvale, CA (US)

( * ) Notice: Subject to any disclaimer, the term of this patent is extended or adjusted under 35 U.S.C. 154(b) by 690 days.

(21) Appl. No.: 10/405,412

(22) Filed: Apr. 1, 2003

(65) Prior Publication Data
US 2003/0231788 A1 Dec. 18, 2003

Related U.S. Application Data

(60) Provisional application No. 60/383,216, filed on May 22, 2002.

(51) Int. Cl.
G06K 9/00 (2006.01)
G06K 9/46 (2006.01)
(52) U.S. Cl. ........................ 382/115; 382/190
(58) Field of Classification Search ............... 382/103, 382/115, 118, 124, 154, 190, 209, 218; 340/5.2, 340/5.3
See application file for complete search history.

(56) References Cited

U.S. PATENT DOCUMENTS

| | | | |
|---|---|---|---|
| 5,410,609 A * | 4/1995 | Kado et al. ................. | 382/118 |
| 5,693,943 A | 12/1997 | Tchernihovski et al. | |
| 5,831,667 A | 11/1998 | Siminou | |
| 5,835,880 A | 11/1998 | Gan et al. | |
| 5,901,203 A | 5/1999 | Morganstein et al. | |
| 5,946,645 A | 8/1999 | Rioux et al. | |
| 5,973,697 A | 10/1999 | Berry et al. | |

(Continued)

FOREIGN PATENT DOCUMENTS

DE 197 12 844 A1 10/1998

(Continued)

OTHER PUBLICATIONS

Blais, G. et al., "Registering Multiview Range Data to Create 3D Computer Objects," IEEE Transactions on Pattern Analysis and Machine Intelligence, New York, N.Y., U.S., vol. 17, No. 8, Aug. 1, 1995, pp. 820-824.

(Continued)

Primary Examiner—Daniel Mariam
(74) Attorney, Agent, or Firm—Fenwick & West LLP

(57) ABSTRACT

Methods and systems are described herein for high-speed observation and recognition of an object which is within or passes through a designated area using 3D image data and tomography, stereo-photogrammetry, range finding and/or structured illumination. Such a security system may comprise multiple pairs of 3D sensors surrounding the designated area such as a portal or doorway. Alternatively, it may comprise a 3D sensor which is capable of acquiring 3D image data of an object that is situated in front of it. Using at least one 3D sensor and a 3D data collection technique such as structured illumination and/or stereo-photogrammetry, 3D image data of the object is acquired. 3D image data representing the object's surface may be determined based on the acquired data and may be compared to data representing known objects to identify the object. Methods for fast processing of 3D data and recognition of objects are also described.

17 Claims, 13 Drawing Sheets

U.S. PATENT DOCUMENTS

| | | | |
|---|---|---|---|
| 6,016,148 | A | 1/2000 | Kang et al. |
| 6,028,672 | A | 2/2000 | Geng |
| 6,031,539 | A | 2/2000 | Kang et al. |
| 6,052,132 | A | 4/2000 | Christian et al. |
| 6,064,426 | A | 5/2000 | Waterman |
| 6,072,894 | A | 6/2000 | Payne |
| 6,084,556 | A | 7/2000 | Zwern |
| 6,142,876 | A | 11/2000 | Cumbers |
| 6,292,575 | B1 | 9/2001 | Bortolussi et al. |
| 6,421,453 | B1 * | 7/2002 | Kanevsky et al. ........... 382/115 |
| 6,445,810 | B2 | 9/2002 | Darrell et al. |
| 6,658,136 | B1 | 12/2003 | Brumitt |
| 6,801,641 | B2 * | 10/2004 | Eraslan ....................... 382/118 |
| 6,868,194 | B2 * | 3/2005 | Tu et al. ..................... 382/312 |
| 2001/0000025 | A1 | 3/2001 | Darrell et al. |
| 2001/0026631 | A1 | 10/2001 | Slocum et al. |
| 2003/0142853 | A1 * | 7/2003 | Waehner et al. ............ 382/118 |
| 2003/0169906 | A1 * | 9/2003 | Gokturk et al. ............. 382/115 |
| 2004/0114806 | A1 * | 6/2004 | Katayama et al. .......... 382/218 |

FOREIGN PATENT DOCUMENTS

| | | |
|---|---|---|
| EP | 0 991 023 A2 | 4/2000 |
| EP | 1 030 188 A1 | 8/2000 |
| EP | 1 103 821 A2 | 5/2001 |
| WO | WO 97/35161 | 9/1997 |
| WO | WO 98/27514 | 6/1998 |
| WO | WO 99/58930 | 11/1999 |
| WO | WO 99/63490 | 12/1999 |
| WO | WO 00/00926 | 1/2000 |
| WO | WO 00/04506 | 1/2000 |
| WO | WO 00/10116 | 2/2000 |
| WO | WO 00/70303 | 11/2000 |

OTHER PUBLICATIONS

Krebs, B. et al., "A Task Driven 3D Object Recognition System Using Bayesian Networks," 6th International Conference on Computer Vision ICCV 1998, Bombay, Jan. 4-7, 1998, IEEE International Conference on Computer Vision, New York, N.Y., U.S., Jan. 4, 1998, pp. 527-532.

Bellm, H. et al., "Optisches Multisensor-System Für Die Industrielle 3D-Werkstückerkennung," Technisches Messen TM, R. Oldenbourg Verlag, Munchen, DE, vol. 57, No. 6, Jun. 1, 1990, pp. 235-240.

Takano, T. et al., "Intruder Detection System by Image Processing," IEEE Proceedings of the Annual International Carnahan Conference on Security Technology, Albuquerque, Oct. 12-14, 1994, New York, N.Y., U.S., vol. 28, Oct. 12, 1994, pp. 31-33.

Ge, Y., "Noncontact 3D Biological Shape Measurement from Multiple Views," May 1994, University of Western Australia, 104 pages.

* cited by examiner

METHODS AND SYSTEMS FOR DETECTING AND RECOGNIZING AN OBJECT BASED ON 3D IMAGE DATA

RELATED APPLICATIONS

This application claims the benefit of priority of provisional application 60/383,216 filed May 22, 2002, which is incorporated herein by reference.

FIELD OF THE INVENTION

The present invention relates to methods and systems for three-dimensional ("3D") identification and recognition of objects or persons. More particularly, the invention relates to methods and systems for providing security systems that identify objects or persons using 3D image data.

BACKGROUND OF THE INVENTION

In today's world, security and access control systems for protecting secure or restricted areas, such as airports, government defense facilities, or corporate sites containing confidential proprietary information, are in high demand. To be effective, security systems for these types of areas must first of all be accurate, that is, a security system must accurately determine both objects or persons who are authorized to enter as well as those objects or persons who must not be granted access. Effective security systems for high volume areas, such as airports, must be fast and easy-to-use. Systems that further add to delay at airports or require a traveler to carry something would further inconvenience the traveler and therefore be unacceptable.

For these reasons, many conventional security systems use biometric data, such as fingerprints, retinal eye patterns, or hand geometry, to identify a person. The captured biometric data is compared to a database of biometric data representing known persons. If the acquired data matches the profile data of an individual from the database, the person may be granted access to a secure facility or identified as someone who should not be granted access. These conventional security systems, however, typically require cooperation of a target, such as a person, and therefore are not designed for "non-cooperative" scenarios, wherein biometric data often must be acquired passively, that is, without requiring any special action, effort or participation of the target to be identified.

Biometric identification systems which do not require a target's cooperation are enjoying great popularity and demand among authorities and companies where security is or is becoming important, such as airports, banks, workplaces and other secure or restricted places. For instance, systems employing biometric facial recognition, unlike security systems that require target cooperation (e.g., fingerprint recognition, iris recognition, etc.), require no human cooperation, awareness, or contact, work passively at a distance in real time environment, and can be easily integrated into existing security systems. Consequently, biometric facial recognition systems are suitable for non-intrusive security checks at high-risk public sites (airports, borders, etc.), and for passive identification and monitoring of known criminals and terrorists.

Conventional systems and methods for biometric facial recognition typically use two-dimensional ("2D") images of a person's face, similar to images received from video or photo cameras. Although 2D image data is easy to collect, it is not uniquely distinctive and the quality of the acquired data is dependent on a variety of conditions, such as ambient light conditions, view angle, etc. Consequently, the reliability of 2D biometric facial recognition systems lags behind many conventional security systems that use biometric data, such as fingerprints, retinal eye patterns, or hand geometry, to identify a person.

Some conventional systems, such as those only capable of capturing 2D image data, experience difficulty in isolating a target image, such as a person's face from other objects, and consequently experience difficulty in identifying the target image. Such systems also experience accuracy problems because the quality of the acquired data is negatively affected by shadows on, the angle of, or movement by the person or object to be identified. In addition, these systems experience difficulties in making assumptions about the target image based on the target's shape because they do not have 3D image data and therefore do not have distance measurements. Furthermore, many of these systems do not reject corrupted image data, further increasing their probability of error.

Other conventional security systems, though capable of capturing 3D image data for target identification, require cooperation of a target for capturing image data and therefore have the same disadvantages as conventional security systems that require target cooperation, e.g., fingerprint recognition, iris recognition, etc. For instance, in conventional 3D image recognition systems, a person may have to knowingly stay in or move through a designated area armed with cameras, such as a portal or doorway, to facilitate image data capture. Some security systems using 3D data do not require cooperation of the target; however, they experience difficulties isolating a target image from a sea of unwanted images, such as trying to isolate one person from a crowd of people in an airport. In addition, speed, accuracy, and portability have been recurrent and difficult to goals to achieve simultaneously for devices that scan, measure or otherwise collect geometric data about 3D objects for identification and recognition.

Still other methods and systems that collect 3D image data are limited by the way the 3D image data is collected. For example, single dot optical scanning systems determines the location of the 3D object based on the angle of reflection of a single point of reflected light. Such systems can digitize only a single point at a time and therefore are relatively slow in collecting a full set of points to describe an object and are further limited by the precision of the movement and positioning of the laser beam. Scan line systems that employ a two-dimensional ("2D") imager, such as a charge coupled device ("CCD") camera, for signal detection projects a light plane (i.e., a laser stripe) instead of just one dot and reads the reflection of multiple points depicting the contour of an object at a location that is at a distance from the CCD camera and from which the position can be triangulated. Such systems typically use a bulky, high-precision mechanical system for moving the scanner and are further limited because the laser stripe stays at a fixed angle relative to the camera and the system makes its calculations based on the cylindrical coordinates of its rotating platform. The mathematical simplicity in such a projection system complicates the hardware portion of these devices as they typically depend on the rotational platform mentioned. Also, the simplified geometry does not generally allow for extremely refined reproduction of topologically nontrivial objects, such as objects with holes in them (e.g., a tea pot with a handle). Full realization of triangulation scanning with a non-restrictive geometry has not been achieved in the available devices.

Deficiencies in still other known methods and systems for three-dimensional identification and recognition occur in the matching process. Methods and systems that collect too much data on the acquired person or object or attempt to increase accuracy by increasing the number of attributes compared may suffer performance problems, that is, recognition of the person or object may take too long for practical application. This deficiency must be balanced against collecting too little information or comparing too few features thereby resulting in a system that is so inaccurate as to not be useful.

SUMMARY OF THE INVENTION

Methods and systems for identifying an object which is within or passes through a designated area are described herein. In certain embodiments of the present invention, first 3D image data representing the object is acquired while the object is within or passes through a designated area. Second image data representing the surface of the object is determined. After the quality of the second 3D image data is checked, the second 3D image data is compared to data representing known objects and, based on the comparison, the object is identified. In certain embodiments, the comparison is performed by generating a feature vector based on the second 3D image data, the feature vector representing features of the object, constructing a filter vector based on the feature vector, determining a subset of data representing known objects based on the filter vector, and comparing the second 3D image data to the subset of data representing features of known objects.

DESCRIPTION OF THE DRAWINGS

The accompanying drawings, which are incorporated in, and constitute a part of the specification, illustrate implementations of the invention and, together with the detailed description, serve to explain the principles of the invention. In the drawings.

DETAILED DESCRIPTION

Consistent with the present invention, a 3D recognition system acquires 3D image data relating to an object for computer-aided processing of that 3D image data, and identifies the object. The principles of the present invention may be applied in a variety of disciplines, such as the fields of security and high-speed surveillance, where the principles of the present invention may be used to capture, detect, and recognize an image of a subject or groups of subjects or other target of interest within an area. An exemplary system may include one or more 3D sensing units or 3D sensors.

For instance, the principles of the present invention are particularly useful in detecting subjects or objects of interest where the subject or object of interest is situated within a designated area. One such example is where a person stands in front of a 3D sensor that is capable of acquiring 3D image data and using that image data for 3D facial recognition.

Additionally, the principles of the present invention may be used to detect subjects or objects of interest where the subject or object of interest is within or moves through an area, such as a portal. One such example is detecting a terrorist that moves through an access portal, such as a security entrance. Another example is verifying that a subject has a known access level (e.g., a frequent flyer status, VIP status, employment status, etc.) and, based on the subject's access level, granting the subject access to a place of business (e.g., a bank, theater, workplace, shop, etc.), i.e., confirming that the subject's 3D image data matches data stored in a database of subjects with known access levels.

The principles of the present invention are also useful for detecting subjects or objects of interest where the subject or object of interest may be part of a group of similar objects or subjects in a controlled area. One such example is detecting a terrorist in a crowded airport. Another example is tracking a known person, such as an employee, within an area, such as an airport, bank or other building.

Consistent with the present invention, the principles of structured illumination, tomography, stereo-photogrammetry, range finding and triangulation combined with computerized image recognition may be used in a 3D recognition and surveillance security system.

A Single Sensing Unit 3D Recognition System

Figure 1:
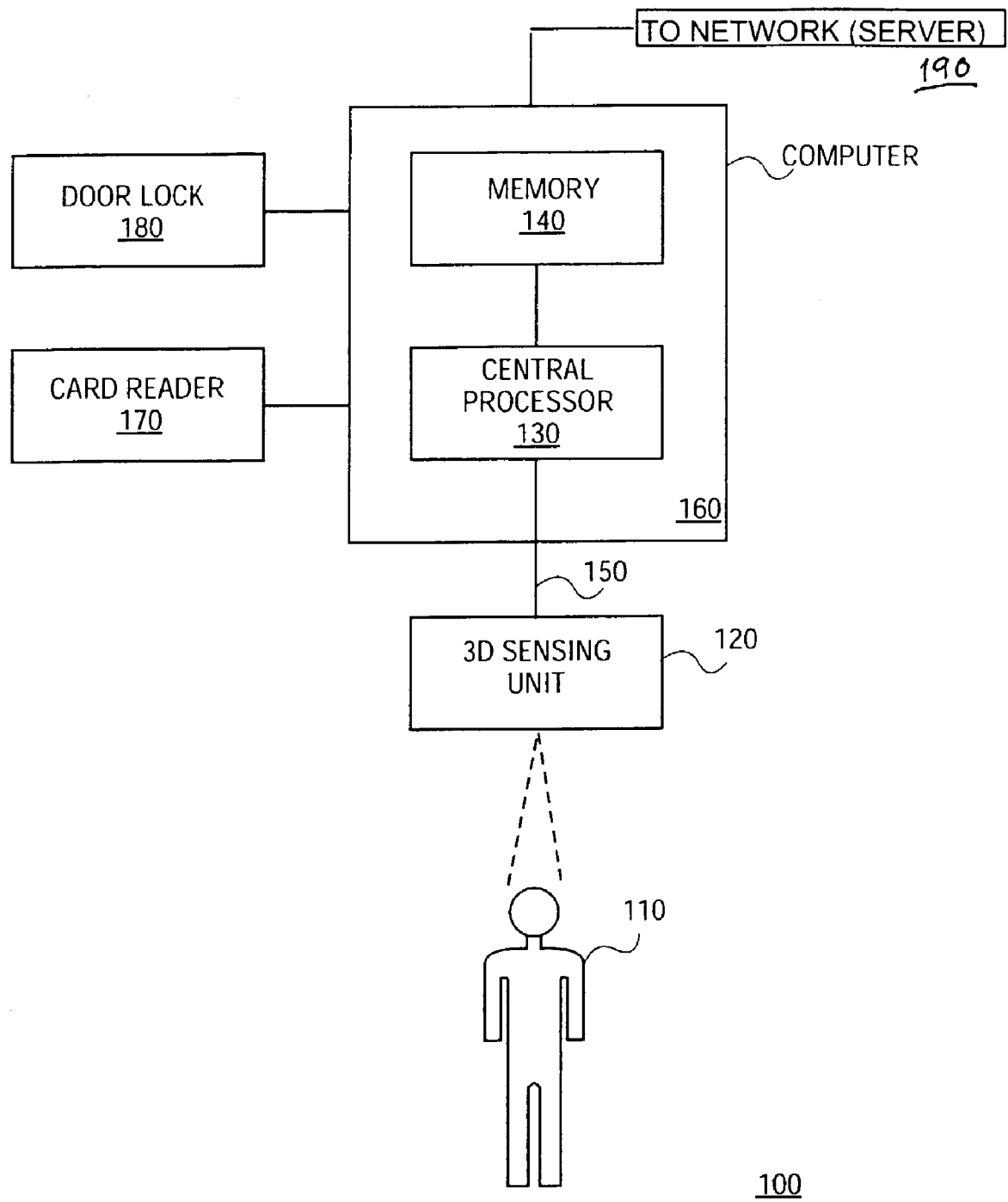
FIG. 1 shows a functional layout of a system consistent with the present invention.

Consistent with the present invention, FIG. 1 shows the functional layout of one exemplary embodiment that provides recognition of an object that is situated within a designated area, e.g., in front of a 3D sensing unit. System 100 comprises at least one 3D sensing unit, i.e., 3D sensor 120. 3D sensor 120 may include one or more illuminating units and one or more detecting units. 3D sensor 120 may be configured such that it is capable of gathering 3D image data of an object of interest that is situated in front of it, such as subject 110, and identifying the object based on the 3D image data.

3D sensor 120 may be operatively connected to processor 130 and, directly or indirectly, to memory 140 via bus 150. In one embodiment, processor 130 taken together with memory 140 form a computer 160. Computer 160 may be operatively connected to an input device 170, such as an identity card reader which performs verification to control access. In addition, computer 160 may be operatively connected to an output device 180, such as a door lock or alarm generator, and to a network and/or server 190.

In other embodiments, some or all of the 3D sensor and/or processor 130, and/or memory 140 may be implemented using or distributed across one or more computers. A computer may include conventional components such as a processor, memory (e.g. RAM), a bus which couples processor and memory, a mass storage device (e.g. a magnetic hard disk or an optical storage disk) coupled to processor and memory through an I/O controller and a network interface, such as a conventional modem. It will be appreciated that the present invention may be implemented in software which is stored as executable instructions on a computer readable medium in a computer system, such as a mass storage device, or memory. Rules, such as the rules for constructing feature vectors, described herein, and other data may be stored in, for example, memory or mass storage on a computer system.

Consistent with the present invention, any of the processors described herein may be microprocessors such as the Pentium® family microprocessors manufactured by Intel Corporation. However, any other suitable microprocessor, micro-, mini-, or mainframe computer, may be used. In addition, memory may include a random access memory (RAM), a read-only memory (ROM), a video memory, or mass storage. Memories may contain a program, such as an operating system, an application programming interface (API), and other instructions for performing the methods consistent with the invention. Mass storage may include both fixed and removable media (e.g., magnetic, optical, or magnetic optical storage systems or other available mass storage technology).

Figure 2:
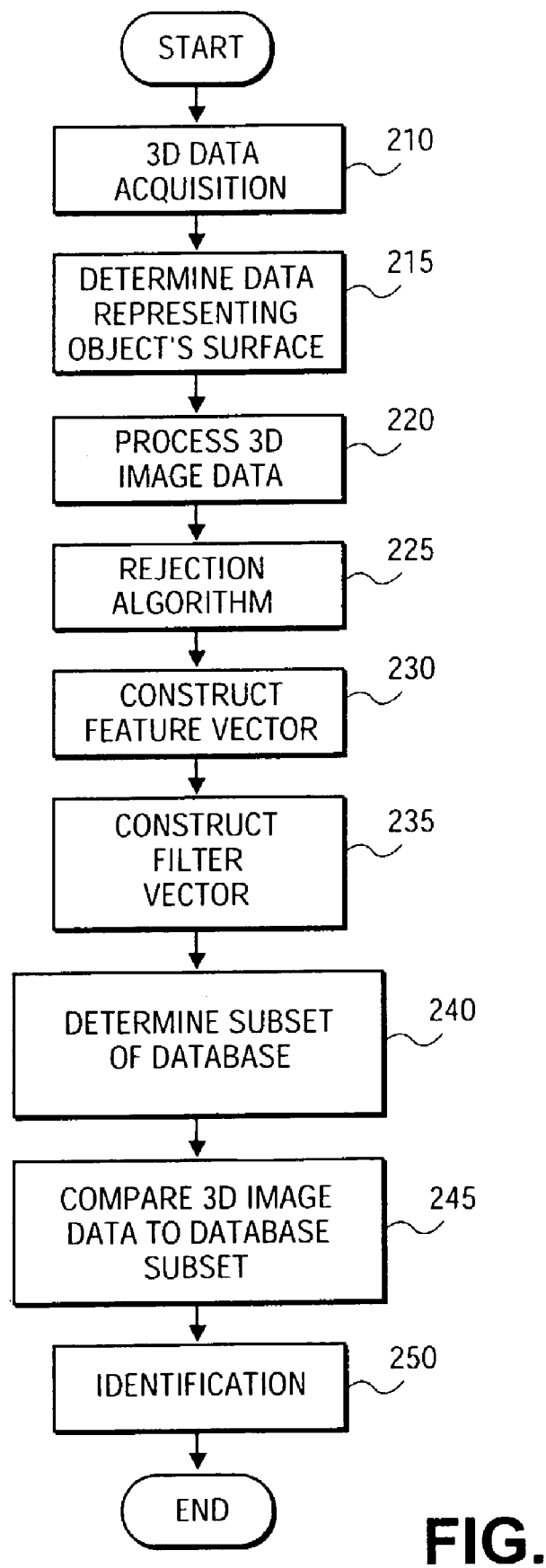
FIG. 2 is a flow chart illustrating an exemplary method of 3D image recognition.

Consistent with the present invention, a 3D recognition system, such as the system depicted in FIG. 1, may comprise one or more 3D sensors that acquire 3D image data representing a 3D image of an object for subsequent computer-aided recognition of the object. An exemplary 3D recognition method for processing the 3D image data and identifying the object consistent with the present invention is shown in FIG. 2. As depicted in FIG. 2, a 3D recognition system first acquires 3D image data representing a 3D image of an object (Stage 210). The 3D image data may be acquired by any suitable means for acquiring robust 3D image data. Methods and systems consistent with the present invention use, for example, structured illumination and/or stereo-photogrammetry.

Structured illumination (also called structured lighting) is a front-lighting technique used to extract surface features from 3D objects and to reconstruct the geometry of the object's surface. In structured lighting, a light pattern (line, grid or other pattern) is projected onto an object at a known angle using a light source or projector. The light source may be any type of light emitting device including, for example, laser, light-emitting diode ("LED"), inert gas lamp, incandescent lamp or other working in visible, ultraviolet or infrared range. The light pattern intersects with an object, and is reflected according to the contours of the object. Detectors detect the deflected light and the observed distortions in the line can be translated into height and depth variations. Structured lighting is sometimes described as "active triangulation."

Stereo-photogrammetry is a technique used to obtain 3D measurements of an object through the process of recording and measuring a pair of images taken by a pair of detectors. In particular, stereo-photogrammetry is used to determine the third coordinate of the spatial location of a point namely a Z-coordinate called distance or depth. The mathematical principles of stereo-photogrammetry are well known to those skilled in the art.

In one exemplary method, 3D image data may be received by series acquisition and 3D images may be processed using principles of computed tomography and principles described in commonly-assigned published PCT Application Number WO 02/75244, which claims priority to Russian Patent No. 200110752 filed Mar. 19, 2001, both of which are hereby expressly incorporated by reference. In that invention, a method is described for contactless control of linear sizes of 3D objects. The method includes the repeated illumination of an object's surface by a beam of optical radiation under different foreshortenings and registration of flat images of the illuminated surface parts at each illumination foreshortening. To restore the object's surface topology, the flat images are reverse projected. Each reverse projection is rotated at an angle corresponding to the respective illumination foreshortening and the rotated reverse projections are summarized.

In that invention, illumination of the object's surface is carried out using structured illumination probing and spatial modulation of an optical radiation beam. The registration of flat images of the illuminated parts of a surface is carried out on a direction distinct from normal. The system also determines the height of a controllable object's surface based on the degree of image distortion of the probing illuminating structure, that is, by measuring the change in position of the illuminated structure in the registered image.

In another exemplary method, 3D images are formed using structured illumination using N different sources of optical radiation, each of a different radiation spectral range, and N photodetectors, each of which has an area of spectral sensitivity conterminous to a radiation spectral range of one of the N radiation sources. The illumination of each of the N sources is structured by a corresponding spatial light modulator (SLM), wherein an SLM may produce an aperiodic line structure of strips which differs from other SLMs. In this method, the structured illumination from the N sources is projected by an optical system, e.g., an afocal optical system, on the object's surface, distorted by a surface relief of the object and collected by the N photodetectors. The collected images are converted by corresponding electronic units to digital signals and preprocessed. The images are summed and the coordinates of the object's surface are computed using the formula:

$$Z = \frac{\Delta Y}{tg\alpha},$$

wherein Z is the height of a surface profile at a point with coordinates X, Y, intersected by any strip of a line structure; $\Delta Y$ is the value of a strip's curvature at that point; and $\alpha$ is the angle between the direction of radiation of a source of an optical image and the objective optical axis.

In one exemplary method, the number "N" is determined by the formula N=log2 (L), where L is the spatial resolution of the reconstructed 3D surface, calculated as the number of surface profiles to be measured. At least one such exemplary embodiment is described in co-pending, co-assigned Russian patent application number 2001133293, filed Dec. 11, 2001, hereby expressly incorporated herein by reference. This method may be used to determine a 3D image of, for example, an object or a controlled area. Difficulty arises, however, in providing recognition of a large field of view, for instance recognition of a controlled area, while at the same time focusing on and providing recognition of one or more objects within that controlled area.

Returning to FIG. 2, the system determines the data that represents the 3D image of the object's surface based on the acquired 3D image data (Stage 215). The system processes the 3D image data representing the 3D image of the object's surface, for example, by filtering out noise (Stage 220). The system checks the quality of the processed 3D image data representing the 3D image of the object, for example, by using a rejection algorithm, such as the rejection algorithm depicted in FIG. 3, described below (Stage 225).

The system constructs a feature vector based on the processed data representing the 3D image of the object (Stage 230). The feature vector may include data representing measurements of anthropological metrics, such as, for example, the distance between a person's eyes, length of a nose, or size of a forehead. The system constructs a filter vector based on the feature vector (Stage 235). For instance, the system may use a set of predetermined criteria to make basic assumptions about the object based on the feature vector. For example, the system may use forensic criteria to predict the gender, ethnic group, or age of a person. The system may then construct the filter vector based on these assumptions. These assumptions may take the form of rules, such as, for example, if the width of the forehead is under nine centimeters, the object is a person under the age of fourteen.

Using the filter vector, the system "indexes" a database, i.e., it determines a subset of the database (Stage 240). The database, for example, may include data representing biometric features of objects or persons known at the time of processing. The system then compares the data representing the 3D image of the object to data within the database subset (Stage 245). Comparing the 3D image data to a subset of the database as opposed to the entire database consumes less processing power and in some cases, less processing time. Upon finding a match between the data representing the 3D image of the object and a data in the database, the object may be identified (Stage 250).

In at least one embodiment, the 3D image data is compared with, for example, a database of biometric data of 3D objects-of-interest. In certain embodiments, the database may include biometric data representing known or suspected terrorists. Biometric data may include, for example, measurements between eyes, nose length, size of forehead, gender, etc. This biometric data in the database may be based on descriptions and/or actual images of suspected or known criminals that were gathered in the course of law enforcement. The database may reside in the memory of the sensing unit, the memories associated with one or more of the 3D sensors, a memory attached to a 3D sensor via a bus, or within another such memory.

Figure 3:
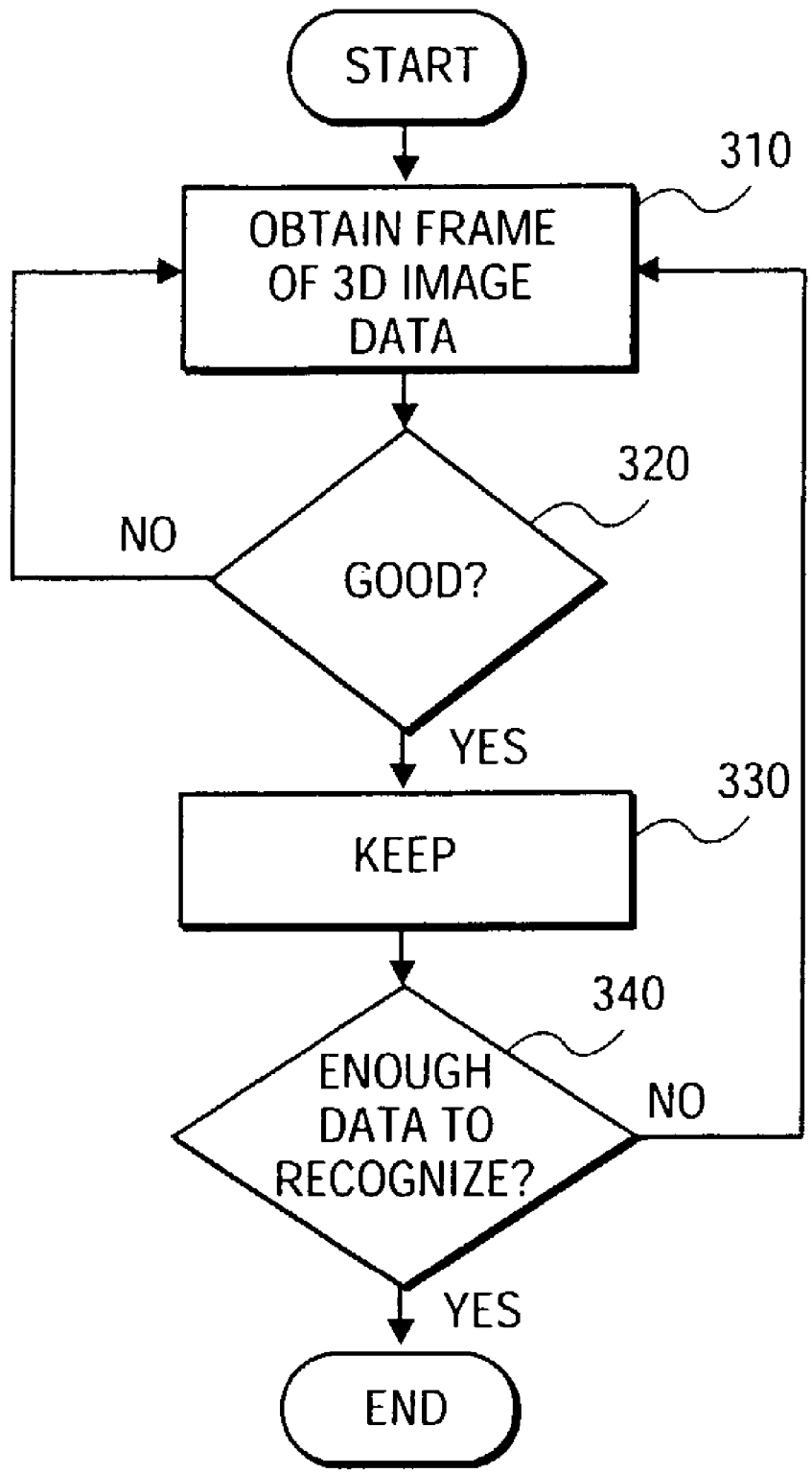
FIG. 3 is a flow chart illustrating an exemplary method of rejecting 3D image data.

In at least one embodiment, the system performs a rejection algorithm to check the quality of the data representing the 3D image prior to using that image data for comparison to a database. FIG. 3 is a flow chart illustrating an exemplary rejection algorithm consistent with the principles of the present invention. As depicted in FIG. 3, data representing a 3D image of the object is obtained (Stage 310). If the 3D image data is determined to be "good" (Stage 320), the 3D image data may be retained (Stage 330). 3D image data may be "good," for example, if it passes a threshold of predetermined criteria. If 3D image data is not good, a different frame of image data representing another 3D image is obtained (Stage 310). If the 3D image data is retained, it is determined if enough data has been retained for recognition (Stage 340). There may be enough data for recognition, for example, if the amount of 3D image data meets a predetermined criteria, such as exceeding a threshold minimum amount of data. The system may then use that 3D image data, for example, to identify an object. If, however, there is not enough data for recognition, a second 3D image data representing a 3D image of the object is obtained (Stage 310).

Exemplary 3D Sensors

Figure 4:
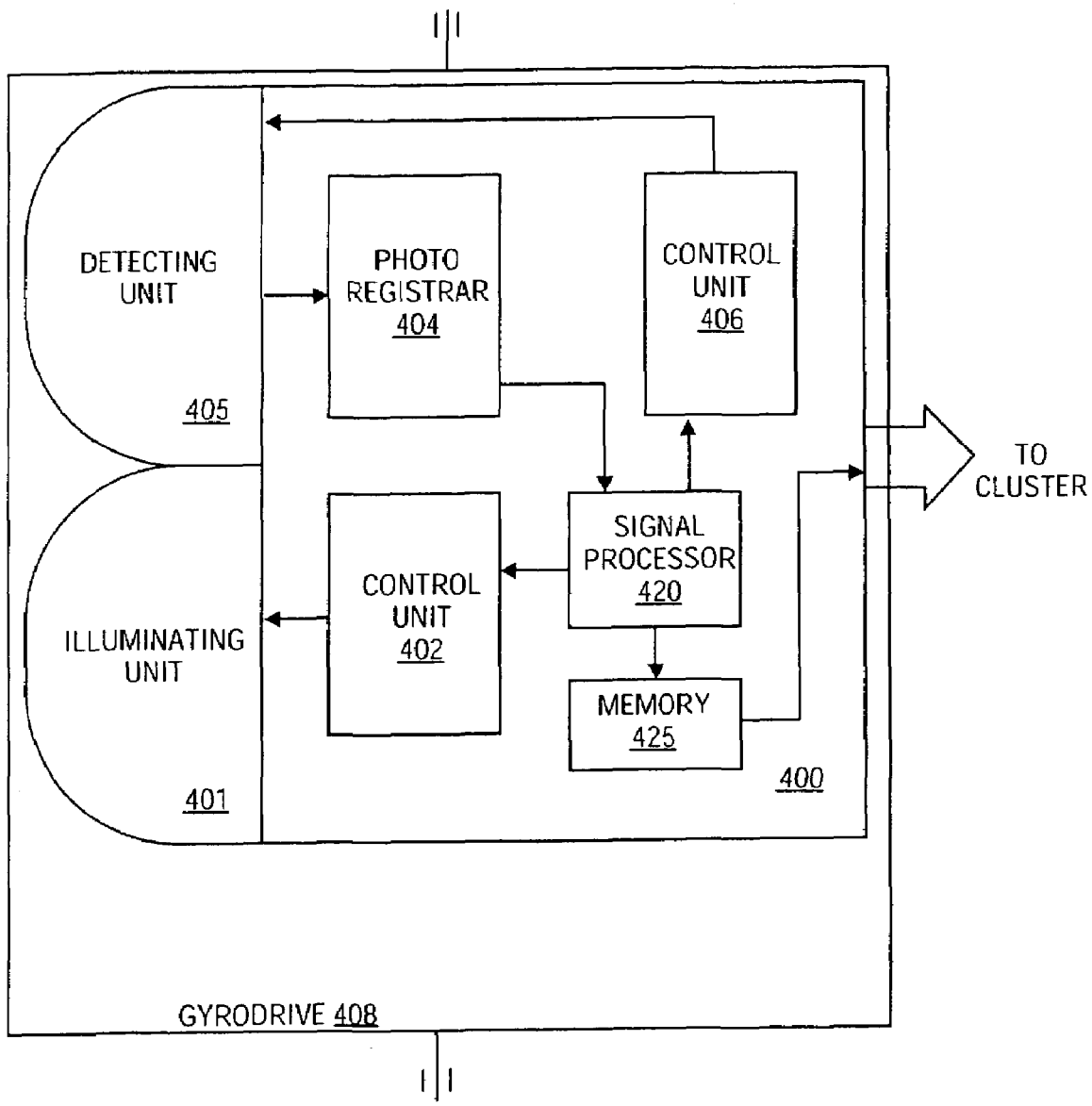
FIG. 4 illustrates a functional layout of one embodiment of a 3D sensor consistent with the present invention.

Consistent with the present invention, a 3D recognition system, such as the system depicted in FIG. 1, may comprise one or more 3D sensors that acquire 3D image data. FIG. 4 shows the functional layout of one embodiment of a 3D sensor 400 consistent with the present invention. In the exemplary embodiment shown in FIG. 4, 3D sensor 400 comprises illuminating unit 401, control unit 402, photoregistrar 404, detecting unit 405, control unit 406, and optionally signal processor 420 and memory 425. A 3D sensor that includes signal processor 420 and/or memory 425 may otherwise be referred to as a "smart 3D sensor."

Illuminating unit 401 may be any suitable light-emitting device such as, for example, laser, light-emitting diode ("LED"), inert gas lamp, incandescent lamp or other working in visible, ultraviolet or infrared range. In certain embodiments, the illumination is provided by a flash or strobe light, which has a very short duration and consequently may be preferable when illuminating moving objects. In certain embodiments of the present invention, illuminating unit 401 may be capable of illuminating an object evenly and, in the other embodiments, it may project a patterned light (such as one or more stripes or a grid) onto the object surface. In certain embodiments, illuminating unit 401 may be a multi-channel illumination source unit as described below and shown in FIG. 5.

Illuminating unit 401 is controlled by control unit 402, which transmits timing and control signals to illuminating unit 401. For example, control unit 402 may control the spatial structure of the projected patterns, that is control unit 402 may control whether illuminating unit 401 illuminates objects in an area evenly or whether it projects a pattern onto the objects. Control unit 402 may also control temporal functions, such as the length of time or frequency of the illumination. In addition, control unit 402 may also control spectral modulations, such as, for example, the wavelength of the generated light. Control unit 402 may be controlled by signal processor 420.

Detecting unit 405 may be any suitable device that forms an image of the object or objects in the area on the sensing elements of photoregistrar 404. Photoregistrar 404 may be, for example, a photodetector array, a typical CCD or CMOS sensor array comprising an array of sensing elements (pixels), or any other device suitable for detecting the reflected radiation. Photoregistrar 404 receives analog information describing an object of interest and transforms the analog information obtained from its sensing elements into digital code that is transmitted to signal processor 420.

Signal processor 420 may perform pre-processing of the digital code and store the pre-processed code into memory 425. Signal processor 420 may control illumination unit 401 and detecting unit 405 via control units 402 and 406. The pre-processed code, such as code for 3D images, may then be processed, for example, by a processor of the 3D sensor or a processor of another system (not shown). Such processing may include comparing data representing a 3D image of an object to data of a biometric features database for image recognition.

In at least one embodiment, detecting unit 405 may include one or more parts of a multi-channel detector as described below and shown in FIG. 6. Control unit 406 transmits timing and control signals to detecting unit 405. Detecting unit 405 may be positioned to receive primarily light transmitted from a neighboring illumination unit and reflected from the surface of an object in the area or transmitted from an opposing illumination unit and passing through the area.

In at least one embodiment of the present invention, one or more 3D sensors 400 may be mounted on an electromechanical drive, such as gyrodrive 408, that allows the 3D sensors to be positioned or moved for stabilization or targeting and is controlled by control units 402 and 406 or by another processor. In certain embodiments, 3D sensors may be moved independently of one another or moved in unison. In other embodiments, some parts of 3D sensor 400 may be mounted on electro-mechanical drive. For instance, illuminating unit 401 and detecting unit 405 may be mounted so that they may be moved together or separately by an electro-mechanical drive, which may be controlled by control units 402 and 406 or by another processor. In other embodiments, illuminating unit 401 or detecting unit 405 may have an additional zoom lens with an electro-mechanical drive to zoom on different distances, which may be controlled by control units 402 and 406 or by another processor.

Figure 5:
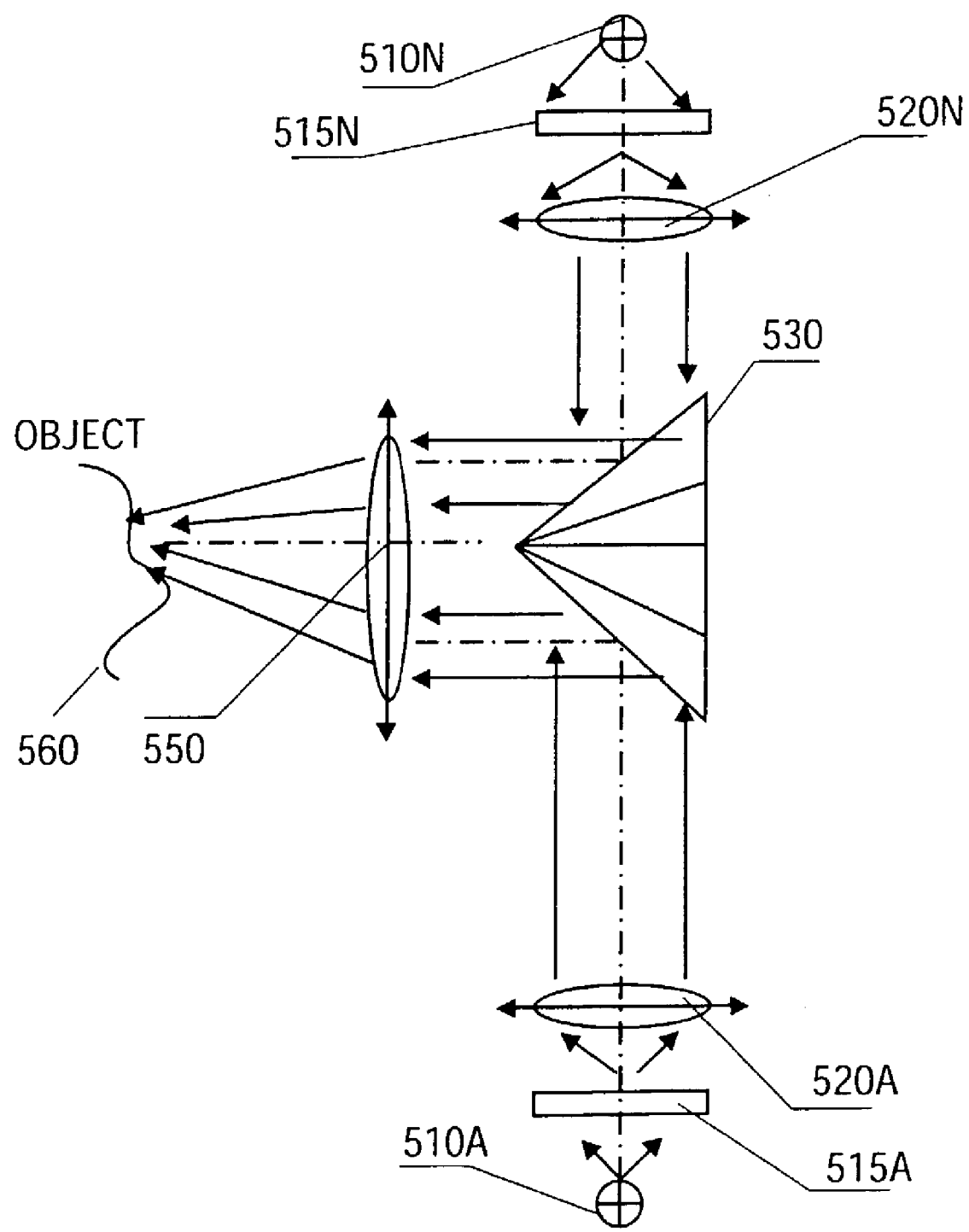
FIG. 5 is a schematic diagram of an illumination source unit consistent with the present invention.

As mentioned above, in certain embodiments consistent with the present invention, illuminating unit 401 may be a multi-channel illumination unit as shown in FIG. 5. As shown in FIG. 5, an exemplary illuminating unit comprises at least one light source 510A–510N, at least one spatial light modulator (SLM) 515A–515N, and/or at least one objective lens 520A–520N, wherein "N" hereinafter represents a variable.

Light sources 510A–510N may generate light beams. In at least one embodiment, one or more light source 510A–510N can generate light of a different spectral range, for example, ranges of the ultraviolet, visible and infra-red spectra of electro-magnetic radiation. Thus, in one such embodiment, light from one to N spectral ranges may be projected on object 560 from the exemplary illuminating unit.

In another embodiment, light sources 510A–510N project light of similar spectral ranges and spatial light modulators (SLM) 515A–515N act as spectral filters of different spectral ranges, such that light from one to N spectral ranges may be projected on object 560 from the exemplary illuminating unit. Alternatively, one or more spectral filters may be oriented within the illuminating unit for filtering light based on spectral range prior to its projection on object 560.

The light from light sources 510A–510N is passed through SLMs 515A–515N. SLMs 515A–515N may be used as code masks with, for example, patterns such as grids, or line structures and used for determining a pattern of light projected onto the object 560. SLMs 515A–515N may be distinct from each other such that the different patterns of light projected on object 560 are unique.

After passing through SLMs 515A–515N, the light is directed by objective lens 520A–520N toward beam generator 530. For example, beam generator 530 may be a pyramid, or one or more mirrors. Beam generator 530 directs the light projected by the light sources 510A–510N toward main lens 550.

Main lens 550 is located at a proper distance from object 560 to form an optical image of the structured illumination on the surface of object 560.

Figure 6:
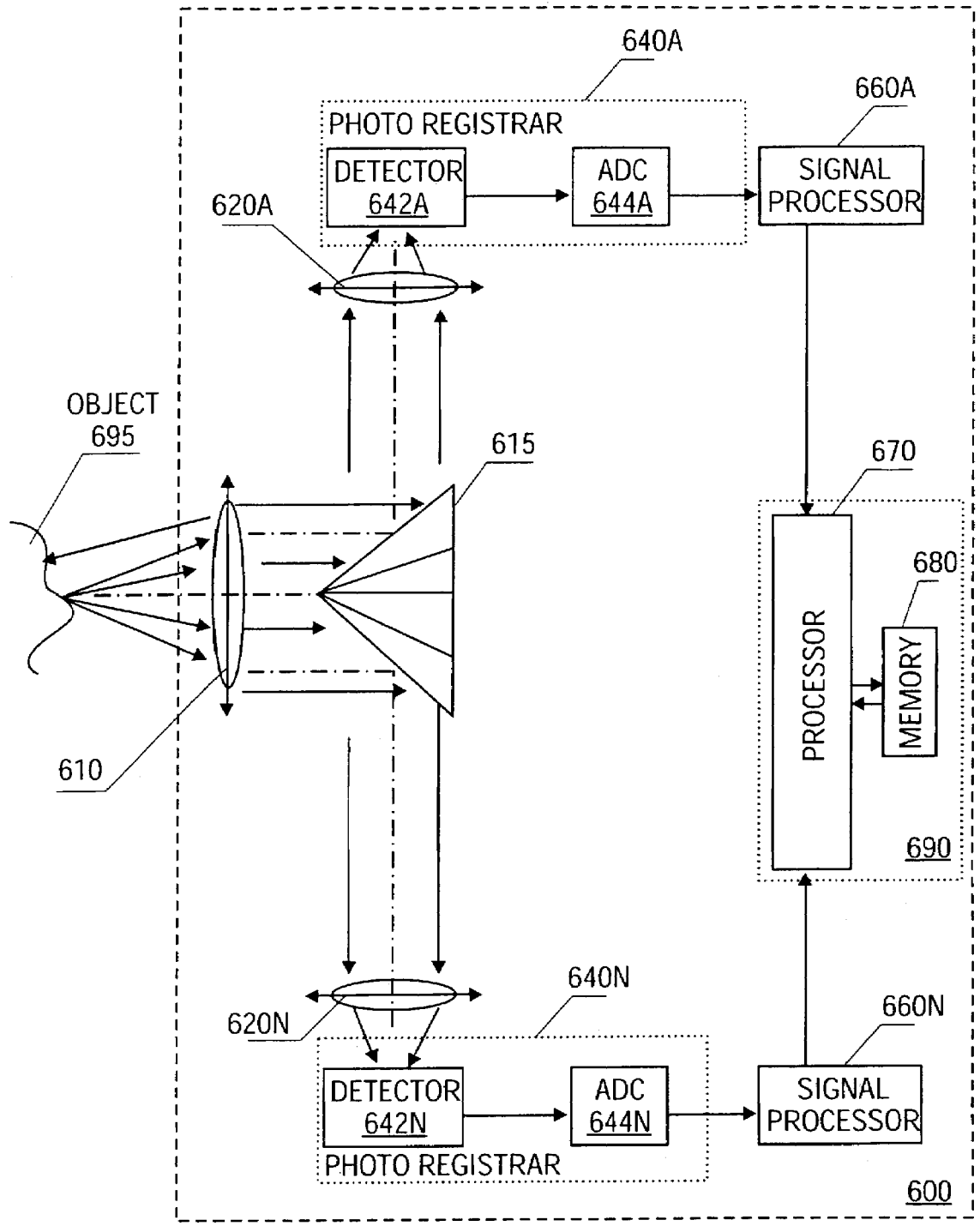
FIG. 6 is a schematic diagram of a multi-channel detection unit with photoregistrar and processor consistent with the present invention.

FIG. 6 shows an exemplary multi-channel detection system for acquiring and processing 3D images. As shown in FIG. 6, a multi-channel unit 600 consistent with the present invention may comprise a main lens 610, a beam splitter 615, additional lenses 620A–620N, detectors 642A–642N, analog-to-digital converters (ADC) 644A–644N, signal processors 660A–660N, and optionally processor 670 and memory 680. Each dotted contour, isolating detector 642N and ADC 644N into a separate unit, may represent a photoregistrar 640N. The dotted contour isolating processor 670 and memory 680 into a separate unit represents an electronic unit 690 that sums the data representing the images.

Main lens 610 is located at a proper distance from object 695 to form an optical image of the surface of object on sensor planes of detectors 642A–642N. Beam splitter 615 may consist of, for example, a pyramid, or one or more mirrors, which is positioned behind main lens 610 so that main lens 610 is located between the object 695 and beam splitter 615. Furthermore, the position of beam splitter 615 is such that it forms an angle, for example, 45 angular degrees, to the optical axis of main lens 610. In one embodiment, beam splitter 615 is the same structure as beam generator 530 depicted in FIG. 5.

An additional lens 620A–620N may be located in each of the N channels formed by beam splitter 615 and project images of the structured illumination distorted by an object's surface onto detectors 642A–642N. Detectors 642A–642N may be one or more of, for example, CCDs, CMOSs, or any other suitable sensor array detecting device. The outputs of each detector 642A–642N may be connected to the corresponding inputs of each ADC 644A–644N. ADCs 644A–644N convert the detected image into a digital code. Detectors 642A–642N together with ADCs 644A–644N form photoregistrars 640A–640N.

The outputs of the photoregistrars 640A–640N are connected to the inputs of signal processors 660A–660N. Signal processors 660A–660N compute the digital input of the structured illumination images. The outputs of signal processors 660A–660N may be connected to the input of electronic unit 690. Electronic unit 690 sums the data representing the received images. Memory 680 together with processor 670 form electronic unit 690. Memory 680 stores the data of structured illumination images processed by photoregistrars 640A–640N for processing by processor 670.

Methods of Operating 3-D Sensors

The exemplary 3D-sensors may be operated in the following exemplary manner, as described with reference to FIGS. 5 and 6. For example, as shown in FIG. 5, one or more light sources 510A–510N illuminate SLM devices 515A–515N in different spectral ranges. The light is focused by additional lenses 520A–520N and directed at beam generator 530. Beam generator 530 reflects the light toward lens 550, which projects the structured light on the surface of object 560.

As shown in FIG. 6, the light is reflected by object 695 (which may be the same as object 560 in FIG. 5) and passes back through lens 610. Lens 610 directs the light to beam splitter 615, which reflects the light toward one or more additional lens 620A–620N. The light passes through the one or more lens 620A–620N and is registered by one or more photoregistrars 640A–640N.

When structured illumination using differing spectral ranges is used, each of the N spectral ranges is registered by at least one corresponding photoregistrar of identical spectral sensitivity. Thus, each image of the structured illumination distortions, formed by heterogeneities of a shape of the object surface, is registered in at least one channel of at least one multi-channel unit of image registration and processing. Consequently, once the object is illuminated, N images of the structured illumination distorted by the object surface are registered in different spectral ranges. Those N images represent different versions of distorted patterns formed by structured illumination. More specifically, each photoregistrar may detect a digital image of one version of the distorted patterns. Digital images differ from another because of the adjustment of the spectral range.

Figure 7A:
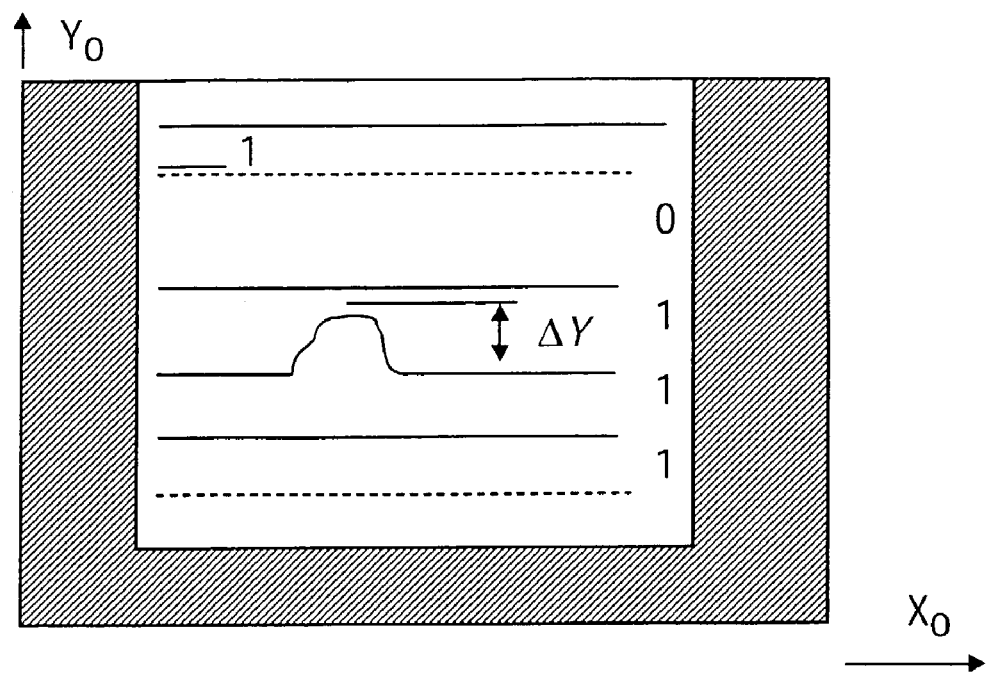
FIG. 7a is a schematic diagram of an object image in structured illumination mode coded in binary code.
Figure 7B:
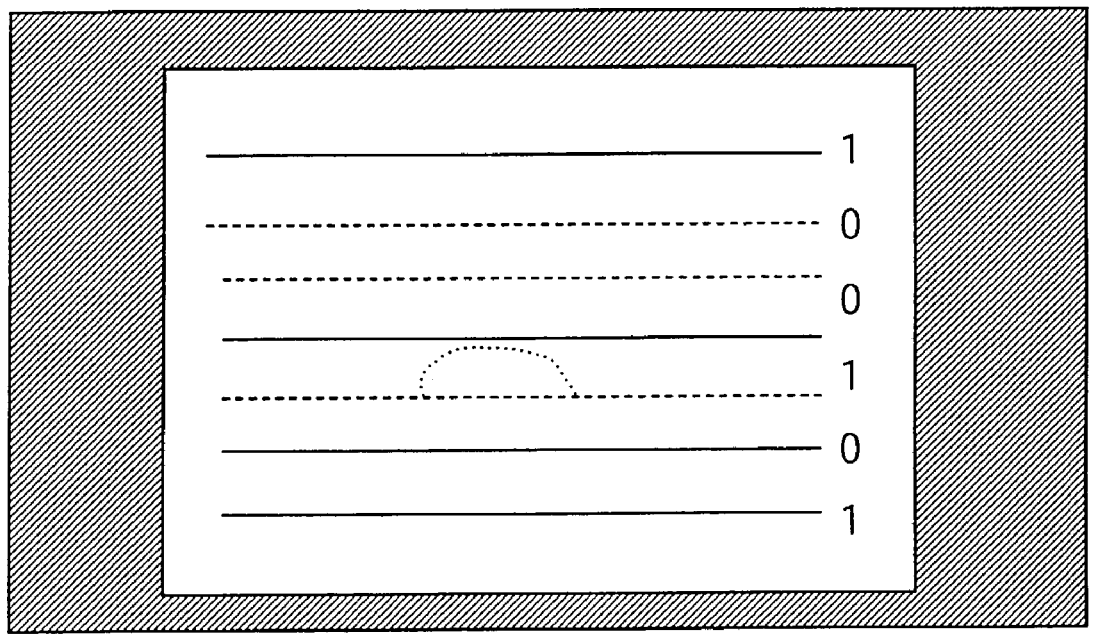
FIG. 7b is a schematic diagram of an object image in structured illumination mode coded in binary code.

As shown in FIG. 6, digital image data from each of the one or more photoregistrars is passed to at least one signal processor 660A–660N. Each signal processor 660A–660N recognizes and processes one version of distorted patterns, such as an aperiodic system of strips. The coding sequence for the pattern of structured illumination may depend on the pattern projected by SLM devices 515A–515N of FIG. 5. For instance, in a system utilizing aperiodic strips, a "1" may be generated when a line is present, and when a line is absent, a "0" may be produced. The output of this exemplary coding sequence is shown in FIGS. 7a and 7b. Consistent with the present invention, the system may, however, utilize other patterns or types of structured light, such as a grid pattern. In addition, other coding schemes for coding the distorted patterns may be utilized.

The resultant processed digital signal such as reconstructed 3D topology from signal processors 660A–660N may be accumulated in electronic unit 690. For example, processor 670 of electronic unit 690 may sum the signals received from each of signal processors 660A–660N to create a "overall" digital image. In addition to summarizing the binary signals, processor 670 may determine the coordinates values (X,Y) of the object's surface. As a result, each line (or strip) in the "overall" digital image may have a unique number in binary code. Based on the summarized codes, processor 670 can then calculate the distance, Z, and corresponding pairs of coordinates because distances between the strips forming structural illumination differ on the registered picture.

Portal Recognition System

Figure 8:
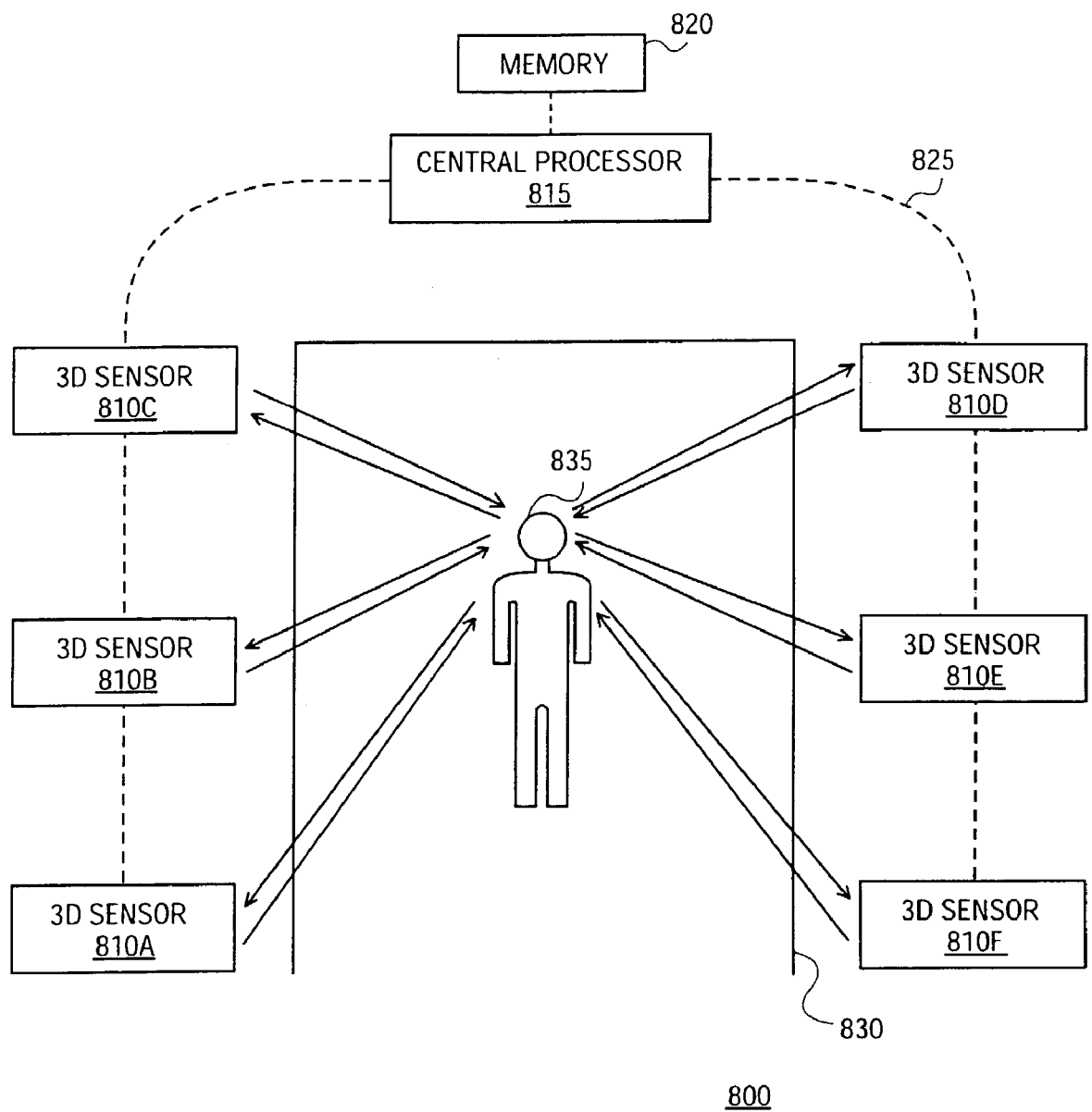
FIG. 8 shows a functional layout of one exemplary embodiment of a system consistent with the present invention.

The principles of the present invention may be used in a wide variety of embodiments, one of which is shown in FIG. 8. FIG. 8 shows an exemplary portal recognition system which is suitable, for example, for use in the field of security as a means for controlling access to a restricted area. Consistent with the present invention, the portal recognition system shown in FIG. 8 provides recognition of an object that is within or moving through a portal. A portal may include, for example, a gate, doorway or area in which an object rests in or moves through. The portal, however, may be of any suitable size, shape or configuration necessary for encompassing the desired field of view and for capturing image data.

System 800, as shown in FIG. 8, comprises 3D sensors, 810A–810F. 3D sensors may be operatively connected to central processor 815 and, directly or indirectly to, memory 820 via bus 825. Additionally, the sensors in FIG. 8 may be arranged such that they surround portal 830. Image data of an object 835, such as a person's face, may be captured, for example, while the object is positioned in or moving through portal 830.

At least some, if not all, of the 3D sensors are oriented so that when a illumination unit 401, included in one of 3D sensor, acts as a source of illumination, a detecting unit 405 of the same or other 3D unit is positioned around the portal so as to be able to receive the illumination reflected from the object 835 which moves through the portal 830. In one embodiment, the 3D sensors are angled to capture images of a person's face as the person moves through the portal. To account for the angle or movement of the person's face or head, the 3D sensors may be angled such that the system can capture images of a large field of view, such as a 180 degrees view. Additionally, at least some, if not all of the 3D sensors are at an acute angle with a neighboring camera when measured from the center of the portal. 3D sensors that are at an acute angle away from one another may be used for stereo-photogrammetry. The 3D sensors may also be used for structured illumination probing.

FIG. 8 shows one exemplary system that comprises 3D sensors, each connected to a bus 825, which may be optionally connected to a processor 815 and a shared memory 820. It should be noted that other exemplary configurations are possible. For example, one or more of the 3D sensors may be operatively connected via a bus directly to processor 815 and/or shared memory 820 or in a ring configuration.

While the embodiment depicted in FIG. 8 is shown with six 3D sensors for simplicity, it should be understood that embodiments of the present invention may comprise any number of 3D sensors. In some applications, such as particularly security systems, it may be preferable to have a system that comprises more than six 3D sensors so that there exist one or more redundant 3D sensors, such that the system may continue to function if one or more 3D sensors become inoperable through malfunction or are rendered inoperable by hostile forces. In addition, the number of 3D sensors used may also depend on the size of the portal containing the object.

In one embodiment, at least one of the 3D sensors may be a "smart" 3D sensor such that it includes a processor and/or memory. For example, on one embodiment, the 3D sensor of FIG. 4 may be used in the system of FIG. 8.

Consistent with the present invention, a 3D recognition system, such as the system depicted in FIG. 8, may comprise one or more 3D sensors that acquire 3D image data representing a 3D image of an object for subsequent computer-aided processing of that 3D image data and identification of the object. In one embodiment, the exemplary 3D recognition method for processing the 3D image data and identifying the object shown in FIG. 2 may be used.

Wide Area 3D Recognition System

Figure 9:
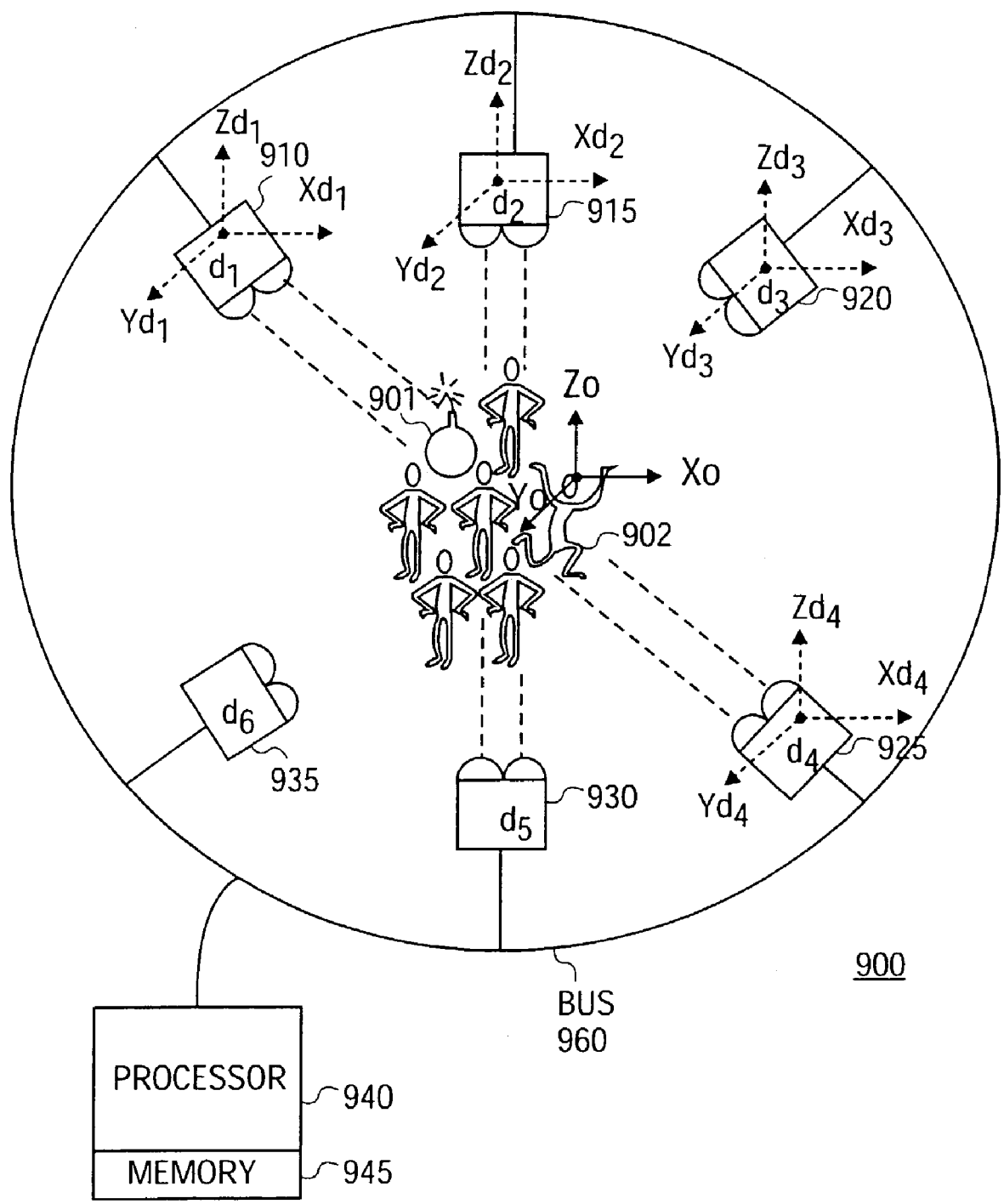
FIG. 9 shows a functional layout of one exemplary embodiment of a system consistent with the present invention.

FIG. 9 shows the functional layout of another exemplary embodiment consistent with the present invention. The system shown in FIG. 9, and described in further detail below, is one example of a system that may be suitable for recognizing objects or persons that are in or passing through a wide area or space. Exemplary applications include security systems for public places such as, airports, lobbies, or other areas where crowds of people may be in or passing through a rather large space. The system shown in FIG. 9 is also one example of a recognition system that does not require cooperation, that is, the object or person does not necessarily need to voluntarily pass through a controlled space, such as a portal, or stand in front of a recognition device.

System 900, as shown in FIG. 9, comprises 3D sensors d1, d2 . . . d6 (910, 915, 920, 925, 930, and 935, respectively). Three-D sensors 910, 915, 920, 925, 930, and 935 optionally may be operatively connected to processor 940 and, directly or indirectly to, memory 945 via bus 960. Additionally, the six 3D sensors in FIG. 9 are arranged in pairs, such that each 3D sensor is directly opposite another 3D sensor. The pairs are further arranged such that the pairs of 3D sensors surround an area, also referred to herein as the "controlled area." An object of interest, such as bomb 901 or subject 902, may be identified while stationary in or moving through the controlled area.

While the embodiment depicted in FIG. 9 is shown with six 3D sensors for simplicity, it should be understood that embodiments of the present invention may comprise any number of 3D sensors. In security applications, for example, it may be preferable to have a system that comprises more than six sensors so that there exist one or more redundant 3D sensors, such that the system may continue to function if one or more 3D sensors become inoperable through malfunction or are rendered inoperable by hostile forces.

As explained above and depicted in FIG. 4, one embodiment of a 3D sensor includes an illuminating unit and a detecting unit. At least some, if not all, of the pairs of 3D sensors are oriented so that when one of a pair of 3D sensors is acting as a source of radiation, the other is positioned across the controlled area so as to be able to receive the radiation. Pairs of 3D sensors that are located directly across the controlled area from one another may be used for tomography. Additionally, at least some, if not all of the sensors, are located so that they are at an acute angle with a neighboring 3D sensor when measured from the center of the controlled area. For example, as shown in FIG. 9, 3D sensor 920 is at an acute angle from 3D sensor 915. Sensors that are at an acute angle away from one another may be used for stereo-photogrammetry.

FIG. 9 shows one exemplary system that comprises multiple 3D sensors, each connected to a bus in the shape of a ring, which may be optionally connected to a processor 940 and a shared memory 945. It should be noted that other exemplary configurations are possible. For example, one or more of the 3D sensors may be operatively connected via a bus directly to processor 940 and/or shared memory 945. In another embodiment, one or more of 3D sensors may comprise a processor and/or memory and the 3D sensors may be operatively configured such that the processors and/or memories of the individual 3D sensors are shared and/or work in parallel. In certain embodiments, any processors and/or memories of the 3D sensors may be configured as a "cluster," that is, a coherent, parallel PC computing system such as a Beowulf cluster. A Beowulf cluster generally consists of a collection of workstations connected through one or more networks. These systems generally use open source system software to provide the features expected of a parallel computer, such as message passing, process management, and global storage.

Figure 10:
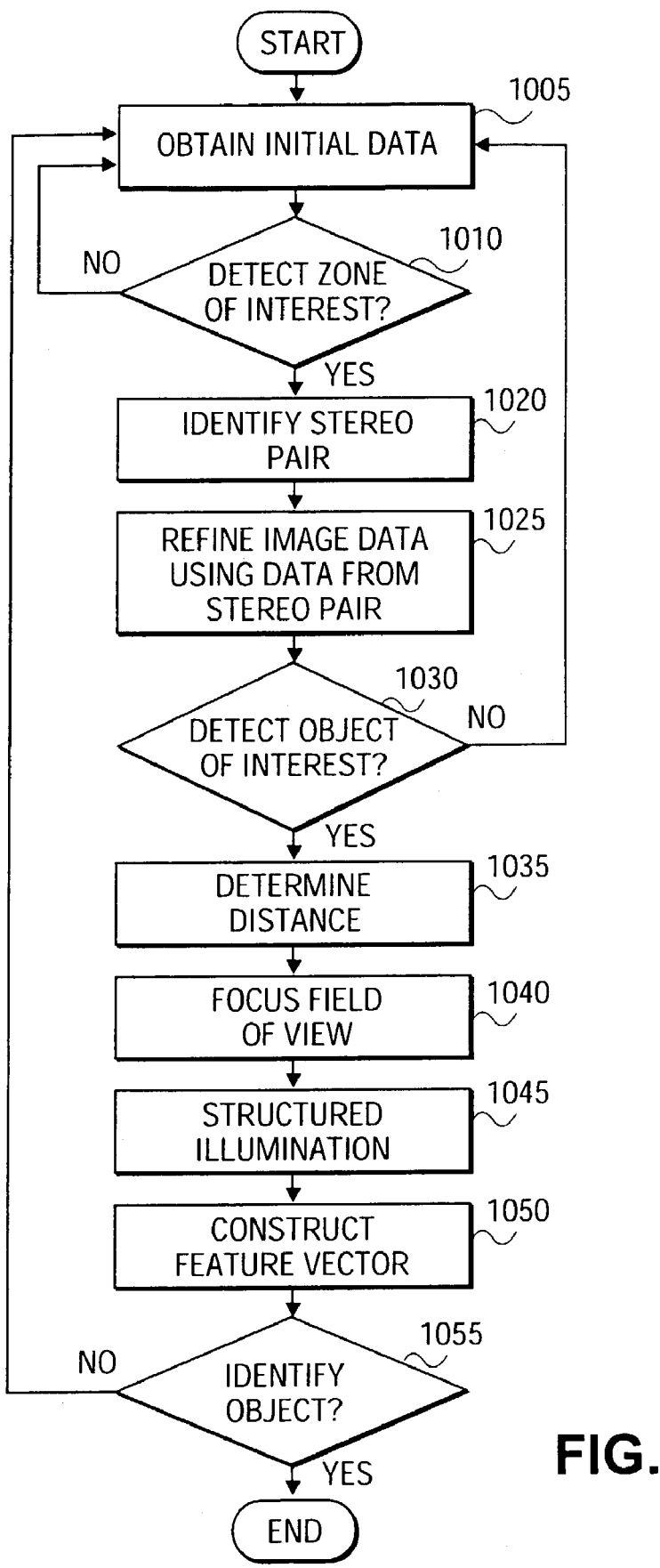
FIG. 10 is a flow chart illustrating an exemplary method of 3D image recognition.

An exemplary 3D recognition method for processing the 3D image data of an exemplary wide area and identifying the object is shown in FIG. 10. As depicted in FIG. 10, 3D sensors may collect initial image data representing the objects or persons in the controlled area. In at least one embodiment consistent with the present invention, the initial image data is collected using tomography, and therefore is referred to herein as tomographic data (Stage 1005). Using the collected image data, the system processes the image data to determine if one or more zones of interest are detected within the controlled area (Stage 1010).

If no zones of interest are detected, the initial image data representing the controlled area may again be collected (Stage 1005). In at least one embodiment, the additional initial image data is collected using tomography. Upon detection of a zone of interest, the system may identify a pair of 3D sensors to perform stereo-photogrammetry of the zone of interest (Stage 1020). The identified stereo pair of 3D sensors may be used to collect image data, otherwise called stereo-photographic data, from the zone of interest. Based on the collected stereo-photographic data, the initial image data of the zone of interest may be refined one or more times to remove noise or other data which can be identified as unrelated to the objects of interest (Stage 1025). The system may then determine if one or more objects of interest are detected based on the refined 3D image data (Stage 1030).

If no objects of interest are detected, the initial image data representing the controlled area may again be collected (Stage 1005). In at least one embodiment, the additional initial image data is collected using tomography. Upon detection of an object of interest, the system may determine the distance from the object of interest to one of the systems' 3D sensors (Stage 1035). That distance may be calculated from the collected data using, for example, range finding and/or triangulation techniques as known to those skilled in the art and which are also described in more detail herein. The determined distance from the object to the 3D sensor may be used to focus the 3D sensor's field of view on the object of interest (Stage 1040). The system may then use structured illumination to acquire 3D image data representing the object of interest (Stage 1045). From this 3D image data, some of the features of the object of interest are extracted (Stage 1050). For example, a feature vector representing a subset of the 3D image data may be generated.

Based on the extracted features, the system may determine if the object of interest can be identified (Stage 1055). For example, the feature vector may be compared to data in a database.

If the object of interest is not identified, initial image data representing the controlled area may be collected again (Stage 1005). In at least one embodiment, the additional initial image data is collected using tomography. If, however, the object of interest is identified, then the system's identification of the object is complete.

In one embodiment, detection of a zone of interest or object of interest within the controlled area includes comparison of the determined 3D image data with, for example, a set of rules governing the controlled area. In another embodiment, the determined 3D image data is compared with a database of biometric data representing 3D objects-of-interest. In certain embodiments, the database may contain only data representing "alarming" data or objects such as, in the security system example, images of known or suspected terrorists or weapons or other dangerous objects. In certain other embodiments, the database may contain only data representing "safe" data or, for example, individuals or objects that should be allowed access to a controlled area. In yet another embodiment, the database may contain data representing both "alarming" and "safe" data. The database containing such data may reside in the memory of one or more of the 3D sensors d1–dn (See FIG. 9), within a memory 945 attached to the cluster via bus 960, or within another such memory.

Consistent with the present invention, the aforementioned method and system use 3D image data to provide both macrolevel recognition (e.g., detection of one or more zones or objects of interest within a controlled area) and microlevel recognition (e.g., identification of an object of interest within the controlled area). Since these operations may be repeated cyclically, the system can monitor the controlled area in automatic, semi-automatic, and manual modes of observation. Furthermore, because the system can continuously capture 3D images at a fast rate, the probability of error is low and decreases as the number of frames taken increases. A low false-acceptance rate as well as a low false-rejection rate is desirable in security systems.

It should be noted that certain embodiments of the methods and systems described herein remain operative even if one or more cameras, projectors, or 3D sensors are disabled. Consistent with the present invention, a system may utilize a smaller or a larger number of cameras, projectors, or 3D sensors. In fact, in a system using a large number of these devices, many of the devices may be disabled before the system experiences a degradation in performance. Such system performance is also based upon the system configuration. For instance, where the 3D sensors process images and perform recognition in parallel, the disabling of one or more 3D sensors does not degrade system performance because working 3D sensors perform the necessary system processing.

The aforementioned systems and methods of the present invention may be implemented utilizing various techniques, such as structured illumination, computed tomography, stereo-photogrammetry, range finding and triangulation.

Computed Tomography

The present invention may use principles of computed tomography ("CT") in the collection of 3D image data. In computed tomography, an infrared or other light source projects a fan-shaped beam which is collimated to lie within an X-Y plane of a Cartesian coordinate system and generally referred to as the "imaging plane". The light beam passes through the object being imaged. The beam, after being attenuated by the object, impinges upon one or more radiation detectors. Multiple detectors may be arranged in the form of a detector array. The intensity of the attenuated beam radiation received at the detector is dependent upon the attenuation of the beam by the object. Each detector element of an array produces a separate electrical signal that is a measurement of the beam attenuation at the detector location. The attenuation measurements, or projection data, from all the detectors are acquired separately to produce a transmission profile.

In conventional CT systems, the light source and the detector array are rotated within the imaging plane and around an object to be imaged so that the angle at which the beam intersects the object constantly changes. A group of beam attenuation measurements, i.e., projection data, from the detector array at one angle is referred to as a "view". A "scan" of the object comprises a set of views made at different angles during one revolution of the light source and detector. The projection data is then processed to construct an image that corresponds to a two-dimensional slice taken through the object.

Consistent with the present invention computed tomography is used to collect the initial image data, otherwise called tomographic data, representing the controlled area. In one embodiment, the controlled area is subjected to illumination from at least two light sources. The light sources may or may not simultaneously illuminate the controlled area. Tomographic data is then gathered by at least two of the 3D sensors.

Computed Tomography and Structured Illumination

Consistent with the present invention, computed tomography may be performed with or without use of the structured illumination. In one exemplary embodiment, the controlled area is subjected to computed tomography without structured illumination. First, pairs of opposite 3D sensors collect shady projections of the controlled area. In each of two or more pairs of 3D sensors, the light source in one of the 3D sensors in a pair generates a source of radiation, such as an infrared beam, and projects the source of radiation through the controlled area. In each pair, a detector in the opposing 3D sensor pair perceives the probing radiation from the opposite 3D sensor. A processor may control pairs of opposite 3D sensors so that when one of the sensors serves as a source of radiation, the other works as a detector, and vice versa.

Each detector element produces an electrical signal that represents the intensity of the received beam and records the attenuation of the beam as it passes through the controlled area. The analog data received by the detectors is converted to digital signals called projections for subsequent processing. The projections are stored in memory. If each pair of 3D sensors operates as both a projector and a detector, two opposite groups of projection data (a "pair") may be collected and stored.

Without structured illumination, the resulting image from one pair of sensors is a shadowy projection of the object. The projections may be used to generate an initial image representing a group of objects or a single object in the controlled area. A 3D representation of the object or objects in the controlled area may be reconstructed, for example, by using the 3D Radon transform. Radon pioneered the idea that if one collects enough 2D projections from various angles, one can completely reconstruct a 3D image. Methods and algorithms for reconstructing a representation of a 3D object using the 3D Radon transform, such as those employed in medical computed tomography (CT) systems, are well known to those skilled in the art.

Figure 11A:
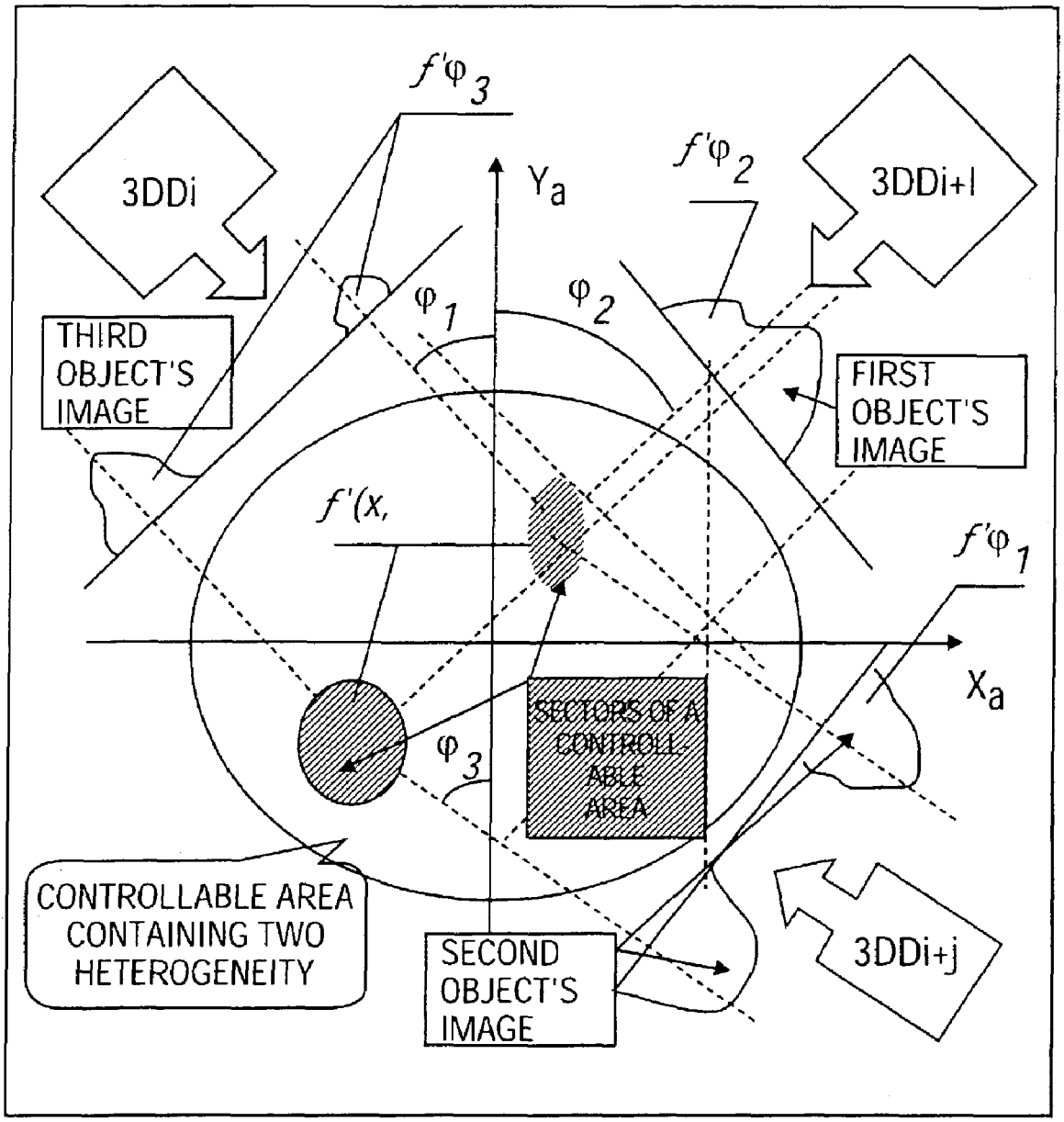
FIG. 11a is a schematic diagram of image projections of two objects constructed using computed tomography.
Figure 11B:
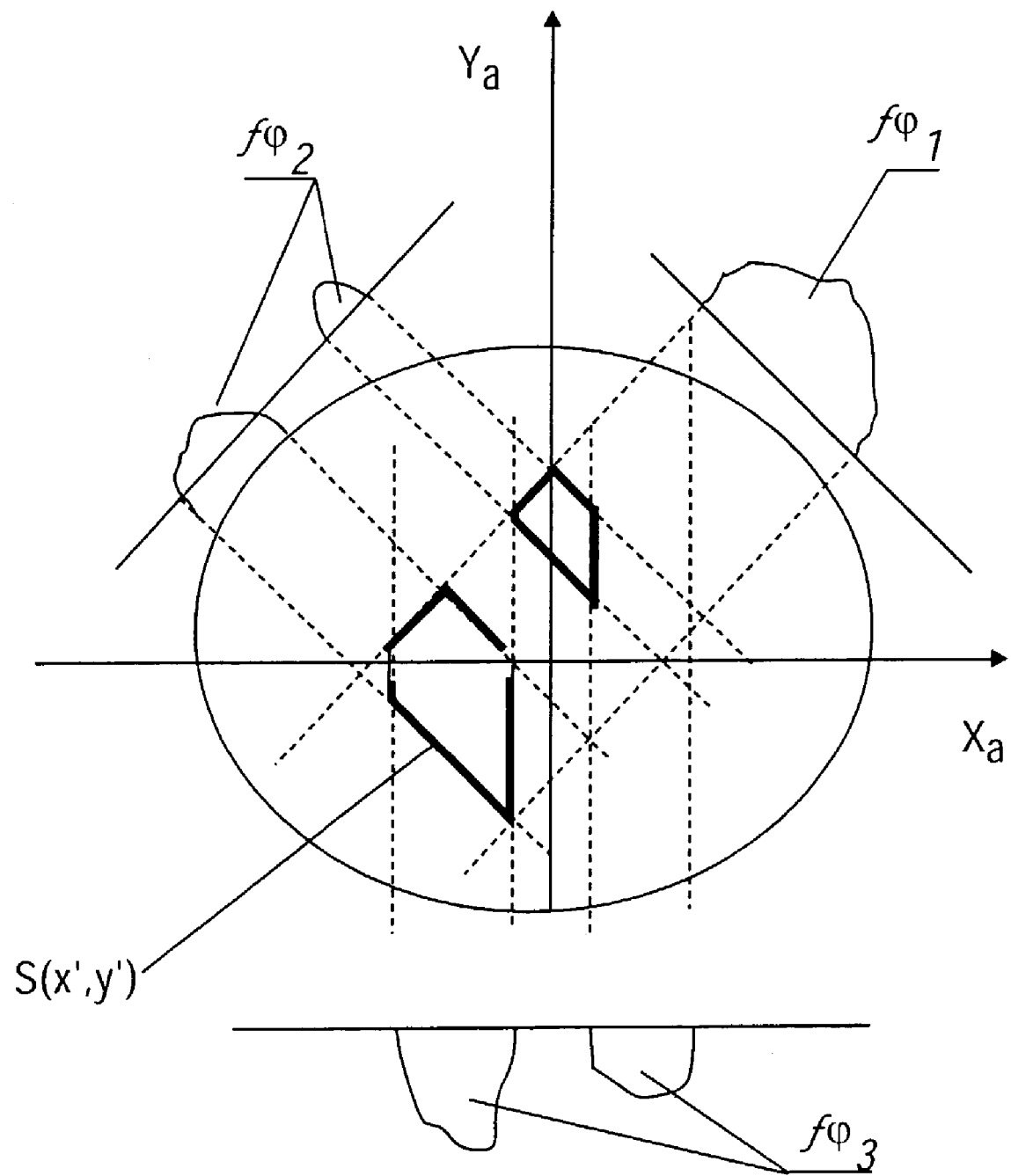
FIG. 11b is a schematic diagram of reverse image projections of two objects.

In one embodiment, an image of the one or more objects in the controlled area is reconstructed by summing the "reverse projections". Illuminating units illuminate the surface of the objects using optical radiation of different foreshortenings. Image data, or projections, of the illuminated objects at each foreshortening may be collected from multiple detectors, each located at known angles. (See FIG. 11A). The projections obtained from each detector are transferred or "reverse projected" to produce a "reverse projection". The reverse projections are rotated at an angle corresponding to the illumination foreshortening and then summarized to create a summary image. (See FIG. 11B). By multiplying the number of projections, heterogeneities in the images interfere and consequently cancel each other out. In general, the method of "reverse projecting" and the associated algorithms are well known to those skilled in the art.

In another exemplary embodiment, the controlled area is subjected to computed tomography with structured illumination. Fourier analysis may be employed to determine the topology of the surface of the object when tomography is performed with structured illumination. Fourier analysis of projections may be used to reconstruct the tomogram using image data gathered with structured illumination. Fourier analysis and the associated algorithms are well known to those in the art.

Stereo-Photogrammetry

Additional image data of a zone of interest may be obtained, for example, by combining the tomographic data with data from 3D sensors using known stereo photographic principles. In one embodiment, the tomographic data and data from the stereo pair, otherwise called stereophotographic data, are collected at the same time. In another embodiment, the stereophotographic data is collected after the tomographic data is collected, for example, by performing a second data collection after a zone of interest is detected. Based on stereophotographic data and tomographic data, the image data is refined and a more refined 3D image of a zone of interest within the controlled area is determined.

Stereo-photogrammetry is a technique used to obtain 3D measurements of an object through the process of recording and measuring a pair of images taken by a pair of detectors. In particular, stereo-photogrammetry is used to determine the third coordinate of the spatial location of a point namely a Z-coordinate called distance. All three coordinates of a point on an object, X, Y, and Z, cannot be determined from only one shot or photograph of an object because it provides only two measured values, coordinates X and Y. Instead, it is necessary to use a second shot of the object wherein the first and second shots are taken from different points in space.

The simplest case of image acquisition (from geometrical stand point) arises when the basis and shots are horizontal. In this scenario, the optical axis of the detector and basis are in the same plane and perpendicular to each other. In certain embodiments, at least neighboring, or proximate, 3D sensors are used to collect image data.

All three coordinates X, Y, and Z of a point on the object may be determined using measured (known) coordinates of the image point on the two or more images as well as intersection formulas. Presumably, the positions and angles of the detectors are known and the two images may be described in two dimensions, X and Y. After determining the correlation between the two images, the differences between the two images are determined and used to estimate the distance of the image from the detectors (or the third dimension, Z). The mathematical principles of stereo-photogrammetry are well known to those skilled in the art.

In lieu of determining distance, however, excess, or height of a point above a constant is determined. Formulas of excess can be considered as special case of the intersection formulas because excess is an increment of distance. Formulas of excess are differential formulas of distance and are well known to those skilled in the art.

Range Finding and Triangulation

The principles of range finding and triangulation may be used to determine the distance of an object from two 3-D sensors. A triangulation system projects beams of light on an object and then determines 3D spatial locations for points where the light reflects from the object.

Figure 12:
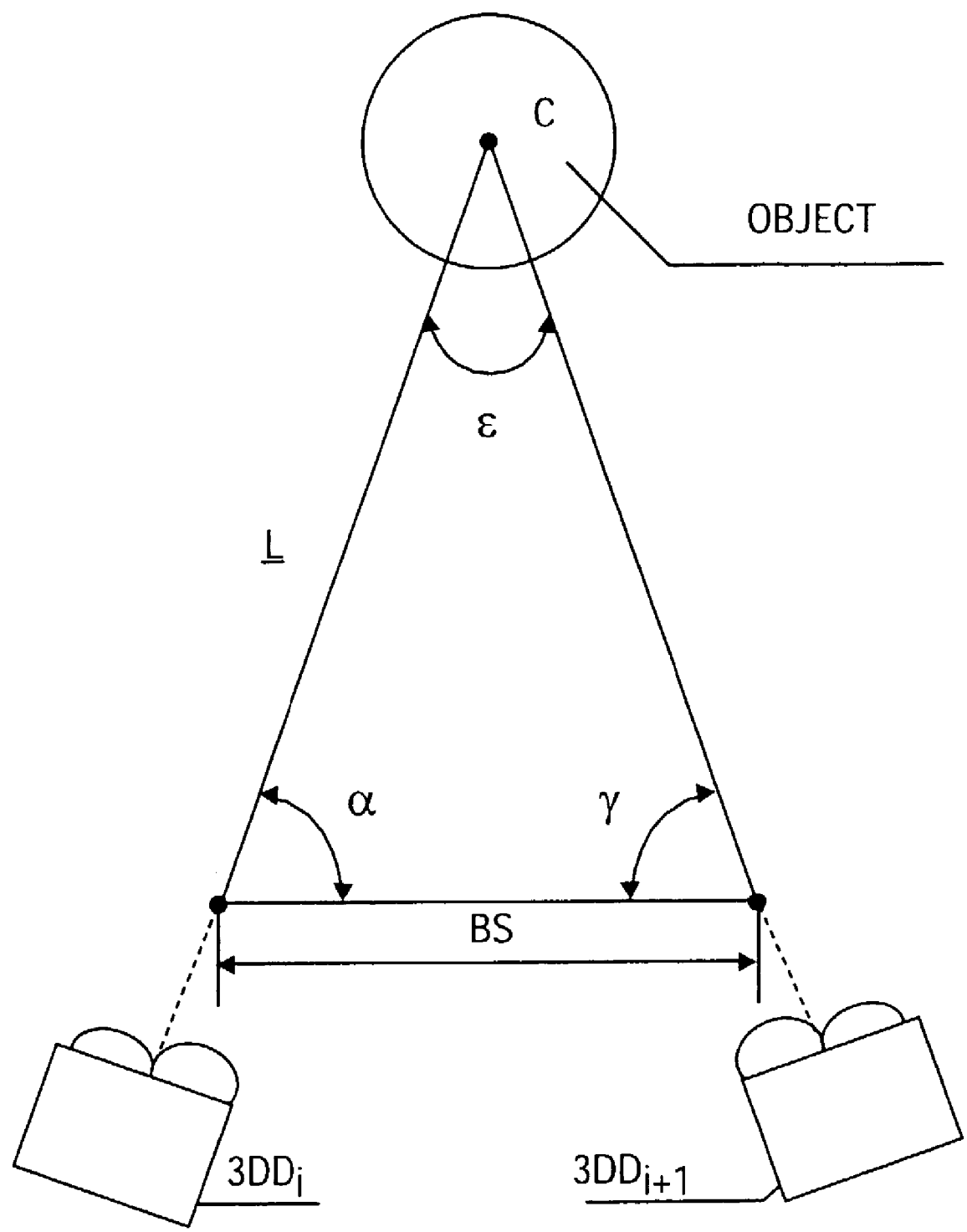
FIG. 12 is a schematic diagram of two 3D sensors using triangulation.

As depicted in FIG. 12, axis of the sensors 3DDi and 3DDi+1 form a measurement triangle. Since the distance between the sensors (BS), parallax angle $\epsilon$, and the angles $\alpha$ and $\gamma$ between axis of the 3-D sensors are measured and known, the distance to object (L) can be determined by triangulation.

Alternative embodiments will become apparent to those skilled in the art to which the present invention pertains without departing from its spirit and scope. For instance, the present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include, for example, machine code produced by a compiler, and files containing a high level code that can be executed by the computer using, for example, an interpreter or equivalent execution engine to facilitate execution of high level code.

Accordingly, the scope of the present invention is defined by the appended claims rather than the foregoing description.

What is claimed is:

1. A method of identifying an object which is within or passes through a designated area, the method comprising:
    passively acquiring by at least one 3D sensor without affirmative cooperation from the object a first 3D image data representing the object while the object is within or passes through the designated area, wherein the object can be modeled by the 3D sensor when the object is at least six inches from the 3D sensor;
    determining second 3D image data representing the object's surface based on the first 3D image data;
    checking the quality of the second 3D image data;
    comparing the second 3D image data to data representing known objects; and
    identifying the object based on the second 3D image data.

2. The method of claim 1, wherein the designated area consists of at least one of a portal, a gate or a doorway.

3. The method of claim 1, wherein passively acquiring by at least one 3D sensor without affirmative cooperation from the object a first 3D image data of the object while the object is within or passes through the designated area includes utilizing at least one of stereo-photogrammetry and structured illumination.

4. The method of claim 1, further comprising:
    processing the first or second 3D image data to filter out noise.

5. The method of claim 1, wherein checking the quality of the first or second 3D image data includes utilizing a rejection algorithm.

6. The method of claim 5, wherein the rejection algorithm includes at least one of the steps of:
    determining if the first, second, or third 3D image data is good; and
    determining if the first, second, or third 3D image data comprises enough data for recognition.

7. A method of identifying an object which is within or passes through a designated area, the method comprising:
    acquiring first 3D image data representing the object while the object is within or passes through the designated area;
    checking the quality of the second 3D image data;
    determining second 3D image data representing the object's surface based on the first 3D image data;
    generating a feature vector based on the second 3D image data, the feature vector representing features of the object; and
    constructing a filter vector based on the feature vector;
    determining a subset of data representing known objects based on the filter vector; and
    comparing the second 3D image data to the subset of data representing features of known objects; and
    identifying the object based on the second 3D image data.

8. The method of claim 7, wherein the feature vector include measurements of anthropological metrics.

9. The method of claim 7, further comprising:
    generating assumptions about the identity of the object based on the feature vector.

10. A system for identifying an object while the object is within or passes through a designated area, the system comprising:
    at least one 3D sensor comprising at least one illumination unit configured for illuminating the object and at least one 3D data collecting unit configured for passively acquiring without affirmative cooperation from the object a 3D image data representing the object while the object is within or passes through a designated area, wherein the object can be modeled by the 3D sensor when the object is at least six inches from the 3D sensor; and a processing unit configured for:

receiving from the at least one 3D sensor the first 3D image data representing the object determining second 3D image data representing the object's surface based on the first 3D image data;

checking the quality of the second 3D image data;

comparing the second 3D image data to data representing known objects; and identifying the object based on the second 3D image data.

11. The system of claim 10, wherein the at least one illumination unit includes at least one of a laser, light-emitting diode ("LED"), inert gas lamp, incandescent lamp or other lamp working in visible, ultraviolet or infrared range.

12. The system of claim 10, wherein the at least one 3D data collecting unit includes at least one of a camera, a photodetector array, and a CCD sensor.

13. The system of claim 10, further comprising:
a central processing unit; and
a memory unit.

14. A computer readable medium containing instructions for controlling a computer system to perform a method of identifying an object which is within or passes through a designated area, the method comprising:

passively acquiring by at least one 3D sensor without affirmative cooperation from the object a first 3D image data representing the object while the object is within or passes through the designated area wherein the object can be modeled by the 3D sensor when the object is at least six inches from the 3D sensor;

determining second 3D image data representing the object's surface based on the first 3D image data;

checking the quality of the second 3D image data;

comparing the second 3D image data to data representing known objects; and identifying the object based on the second 3D image data.

15. A computer readable medium containing instructions for controlling a computer system to perform a method of identifying an object which is within or passes through a designated area, the method comprising:

acquiring first 3D image data representing the object while the object is within or passes through the designated area;

determining second 3D image data representing the object's surface based on the first 3D image data;

checking the quality of the second 3D image data;

generating a feature vector based on the second 3D image data, the feature vector representing features of the object; and constructing a filter vector based on the feature vector;

determining a subset of data representing known objects based on the filter vector; and comparing the second 3D image data to the subset of data representing features of known objects; and identifying the object based on the second 3D image data.

16. An apparatus for identifying an object comprising:

at least one 3D sensor configured to passively acquire without affirmative cooperation from an object, a first 3D image data representing the object while the object is within or passes through a designated area, wherein the object can be modeled by the 3D sensor when the object is at least six inches from the 3D sensor;

a processing unit configured for receiving from the at least one 3D sensor the first 3D image data representing the object; determining second 3D image data representing the object's surface based on the first 3D image data; checking the quality of the second 3D image data; comparing the second 3D image data to data representing known objects; and identifying the object based on the second 3D image data; and a memory unit capable of storing 3D image data.

17. An apparatus for identifying an object comprising:

a processing unit configured for acquiring first 3D image data representing the object while the object is within or passes through a designated area; determining second 3D image data representing the object's surface based on the first 3D image data; checking the quality of the second 3D image data; comparing the second 3D image data to data representing known objects; generating a feature vector based on the second 3D image data, the feature vector representing features of the object; and constructing a filter vector based on the feature vector; determining a subset of data representing known objects based on the filter vector; comparing the second 3D image data to the subset of data representing features of known objects; and identifying the object based on the second 3D image data; and a memory unit capable of storing 3D image data.

* * * * *